T. D. C. SMITH.
CULINARY VESSEL.
APPLICATION FILED SEPT. 10, 1921.

1,417,582.

Patented May 30, 1922.

Inventor
Theodore D. C. Smith
By
Attys.

UNITED STATES PATENT OFFICE.

THEODORE D. C. SMITH, OF SOUTH PORCUPINE, ONTARIO, CANADA.

CULINARY VESSEL.

1,417,582.  Specification of Letters Patent.  Patented May 30, 1922.

Application filed September 10, 1921. Serial No. 499,750.

*To all whom it may concern:*

Be it known that I, THEODORE D. C. SMITH, a subject of the King of Great Britain, and resident of South Porcupine, in the Province of Ontario and Dominion of Canada, have invented certain new and useful Improvements in Culinary Vessels, of which the following is a full, clear, and exact description.

This invention relates generally to improvements in construction of cooking and other vessels, and more particularly to improvements in construction of the handles thereof, and the object of the invention is to provide cooking vessels having removable handles, which will permit the vessels to be stored in small space and which will have other advantages hereinafter pointed out.

At the present time, cooking vessels of many types, for example double boilers, saucepans, frying pans and the like, are provided with rigid handles which extend radially therefrom. The projection of these handes makes the storage of the vessels or the packing of same either for shipment from manufacturers to dealers or from dealers to customers or in the customer's premises a somewhat awkward proposition. Frequently vessels which might otherwise be nested are prevented from being thus packed by the position of the handles. When the vessels are in use the handles are bothersome, either projecting outwardly from a stove and always rendering the vessel liable to be knocked off or else projecting inwardly over the stove and absorbing heat to such a degree that the handles cannot be grasped with bare hands without the user being burned. It furthermore happens that the attachment of handles to vessels is frequently defective, so that an otherwise good vessel is rendered at least temporarily useless by reason of the handle becoming detached. In addition to this, it may be pointed out that a large proportion of the vessels used are enamel-coated and that frequently the material used in the handles is so thin that the handles bend in use, so that the enamel chips off and the appearance of the vessel ruined, with the further possibility of splinters of enamel entering an incautious user's flesh and causing serious trouble.

According to the present invention, the vessels are provided with a socket in which a detachable handle may be readily engaged and from which it may be readily disengaged. The separable handle avoids all the disadvantages heretofore pointed out and in addition has the advantage that only one handle need be provided for a series of vessels, thereby rendering possible a reduction of cost. The socket provided opens at the sides and the handle is in the nature of a pair of tongs which enter the socket from opposite sides with the result that the tongs are naturally held closed by the operation of holding the handle. The shape of the socket and handle is such that there is no tendency for the weight of the vessel to pry the handle open when the vessel is tilted to pour out its contents. The tongs are further so formed that they will not become disengaged from the socket if released but will remain attached to the vessel until positively opened.

In the drawings which illustrate one embodiment of the invention;—

Figure 3:
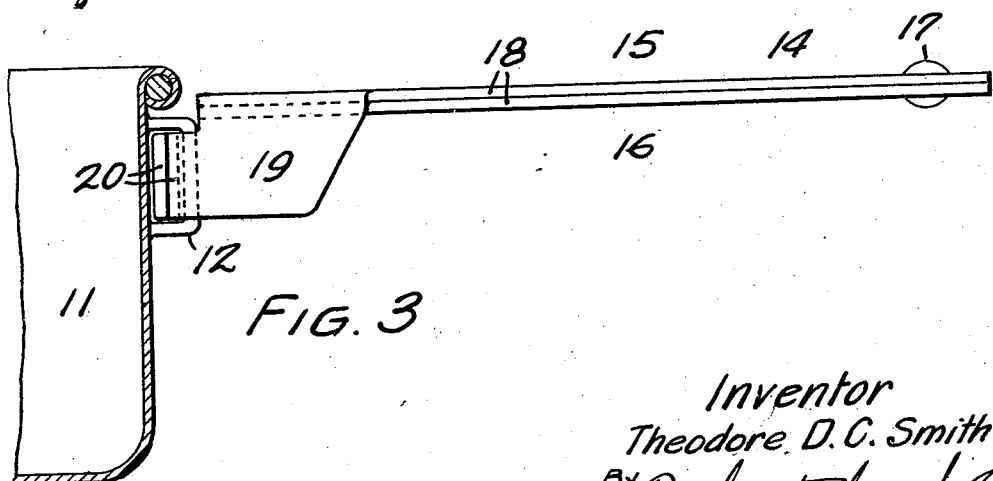
Fig. 3 is a side elevation of the device.

Referring more particularly to the drawings, 11 designates a vessel of any suitable size and shape having attached thereto a vertically disposed flattened loop or eye 12, that is to say, an eye having the passage therethrough horizontally disposed. The eye is of considerable depth and width, as clearly shown in the drawings. The eye may be attached directly to the vessel in any suitable way, as shown in Figure 3, or may be attached to a plate 13, which is in turn attached to the vessel in any suitable manner, for the purpose of stiffening a thin-walled vessel at the point of attachment and of distributing the load over a considerable part of the vessel wall to minimize the possibility of the socket being torn away from the vessel.

Figure 2:
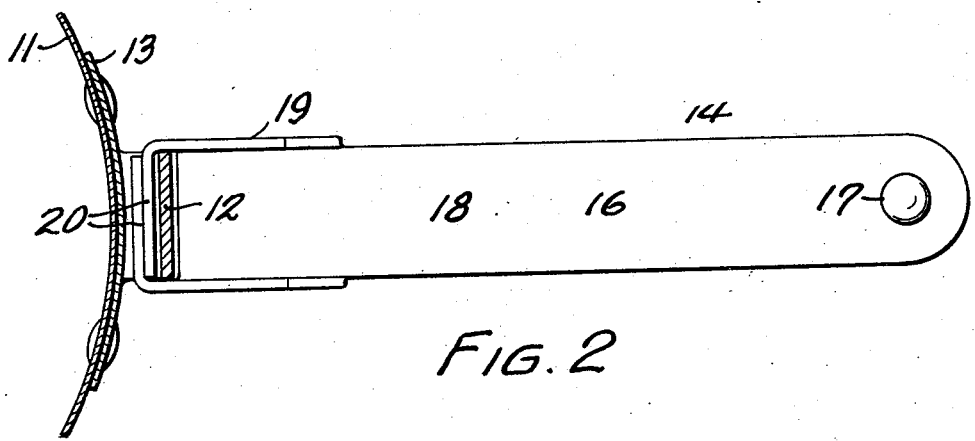
Fig. 2 is a bottom plan view partly in section showing the handle closed upon the socket.

The handle, designated as a whole, by the numeral 14 comprises a pair of substantially similar arms 15 and 16 pivotally connected at one end by a rivet or the like 17. Each of the arms 15 and 16 is preferably a flat plate 18 of sufficient thickness and width to have the requisite stiffness and preferably of the same length from the centre of the pivot 17. The remote edges of these plates are provided with downturned flange portions 19, which extend beyond the ends of the plates and are turned at right angles so as to present claws 20 lying at right angles to the long edges of the plates 18. One of these claws, for example, that carried by the arm 15, is slightly farther from the pivot 17 than the claw of the other arm, so that when the handle is closed bringing the plates 18 into superposed relation the claws will overlap one another, as clearly shown in Figure 2. The length and depth of the claws 20 are made substantially the same as the length and depth of the eye opening, so that when the handle claws are in position in the eye they substantially fill the same and hold the eye and vessel thereto against rotation about an axis extending longitudinally of the handle. In the same way, the thickness of the claws is such that when the two are in overlapped relation they substantially fill the space between the vessel or plate 13 and the outer part of the eye, as shown in Figures 2 and 3.

Figure 1:
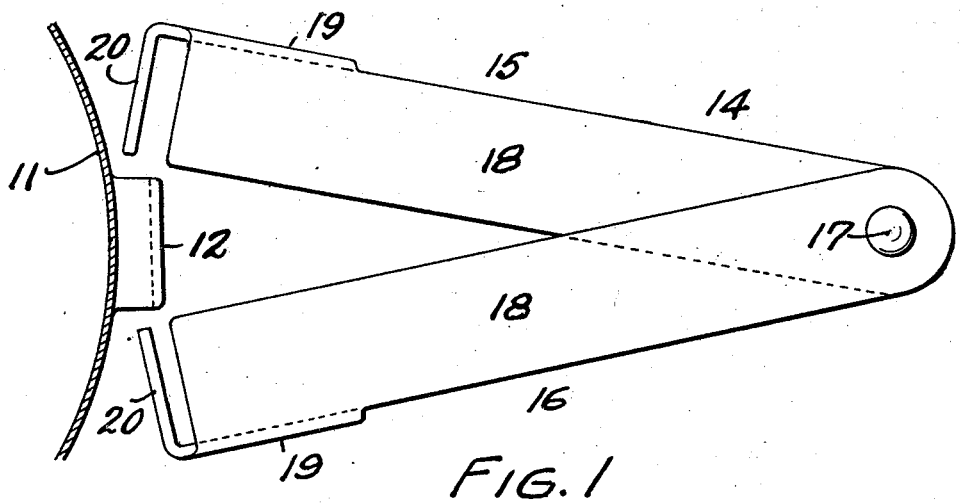
Fig. 1 is a plan view of the device showing the handle open ready to engage the vessel socket.

The operation of the device is extremely simple. The handle is held in the position and in the relation to a vessel eye shown in Figure 1. A simple closing movement of the handle brings the two arms thereof into superposed or aligned position, as shown in Figure 2, and at the same time causes the claws 20 to pass through the eye from opposite sides and to assume an overlapping relation within the eye, as shown in Figure 2. To disengage the handle from the vessel the operations are reversed.

Owing to the material length and depth of the claws 20 and to the fact that they completely fill the eye, the vessel cannot oscillate or rotate relatively to the handle and therefore has no tendency to wedge or lever the handle arms apart and cause a separation of the handle from the vessel. The engagement of the handle arms from opposite sides of the eye precludes all possibility of the handle slipping from the vessel. The handle is of such width that it may be conveniently grasped and the pot easily tipped to pour out its contents. In fact, with a thin flat handle as illustrated, this tipping of the vessel is performed with much greater ease than with the hollow substantially cylindrical handles applied to many vessels, which must be very tightly grasped to hold them from rotating in the user's hand. According to this invention, vessels of different sizes may be nested and stored in very small space and when in use on a stove there are no projecting handles to be in the way and cause overturning of the vessels or to become heated. The handle is so easily attached to and detached from the vessels that no time will be lost, the handle being attached by exactly the same motions used to reach for and grasp a permanently attached handle. The handle may therefore be kept separate from the pots when the same are in use and will always be cool. A single size of handle may serve for all sizes of vessels, so that the user need purchase only one handle for many vessels and, when the vessels are worn out or rendered unserviceable, only the vessel is lost.

While the description has thus far dealt with only a single eye to each vessel and with a straight or radial handle, it will be understood that each vessel may have as many eyes as desired attached thereto and that the same method of attachment may be used for bail handles.

Although the invention has been described as relating to culinary vessels, it will be understood that it is equally applicable to melting pots or crucibles and foundry pouring ladles as well as other vessels.

Having thus described my invention, what I claim is:—

1. In combination with a vessel having an eye thereon a removable handle comprising a pair of pivotally connected arms, and inwardly directed claws on said arms adapted for engagement in the vessel eye.

2. In combination with a vessel having an eye thereon a removable handle comprising a pair of pivotally connected arms, and transversely disposed claws on said arms adapted for engagement with the vessel eye and disposed at such distances from the handle pivot that they will assume overlapping relation in closed position of the handle.

3. In combination with a vessel having an eye thereon, a removable handle comprising a pair of pivotally connected arms and transversely disposed claws on said arms adapted for engagement in the vessel eye, said claws being of a size and shape to completely fill the vessel eye and hold the vessel against rotation relatively to the handle.

4. A removable handle comprising a pair of arms pivotally connected at one end, and inwardly directed claws at the opposite end of said arms.

5. A removable handle comprising a pair of arms pivotally connected at one end, and claws at the opposite end of said arms movable into overlapping relation.

6. A removable handle comprising a pair of pivotally connected members and claws carried by said members movable into overlapping relation.

7. A removable handle comprising a pair of flat plates pivotally connected at one end, depending flanges on remote edges of said plates at the free ends thereof, said flanges projecting beyond the plate ends and turned across the plate ends in spaced relation thereto.

8. A device according to claim 7, in which the turned flange portions are so spaced from the pivotal point of the arms that they may assume overlapping relation.

In witness whereof, I have hereunto set my hand.

THEODORE D. C. SMITH.